March 28, 1967 W. SMEULERS 3,311,847
CIRCUIT FOR CONTROLLING THE OSCILLATION FREQUENCY
OF TRANSISTORIZED SAWTOOTH OSCILLATORS
Filed May 4, 1965 2 Sheets-Sheet 1

INVENTOR.
WOUTER SMEULERS
BY
Frank R. Trifari
AGENT

INVENTOR.

WOUTER SMEULERS
BY

Frank R. Trifari
AGENT

United States Patent Office 3,311,847
Patented Mar. 28, 1967

3,311,847

CIRCUIT FOR CONTROLLING THE OSCILLATION FREQUENCY OF TRANSISTORIZED SAWTOOTH OSCILLATORS

Wouter Smeulers, Emmasingel, Eindhoven, Netherlands, assignor to North American Philips Company, Inc., New York, N.Y., a corporation of Delaware Filed May 4, 1965, Ser. No. 453,069
Claims priority, application Netherlands, May 5, 1964, 64/04944
10 Claims. (Cl. 331—111)

This invention relates to circuits for controlling the oscillation frequency of transistorized sawtooth oscillators by means of a direct control voltage.

Sawtooth oscillators are frequently used, for example in television receivers for the line or raster deflection of the electron ray in the display tube. Several methods may be used for synchronizing the oscillator with the incoming signal to be reproduced.

The first method consists in synchronizing the oscillator directly by means of the incoming signal, for example, the synchronizing pulses of the television signal. This method affords the advantage that great frequency deviations of the oscillator can be corrected and that, in addition this correction is made almost immediately. The disadvantage of this so-called direct synchronization is, however, the great sensitivity to interference, so that even small transient interference in the signal detrimentally affects the operation of the sawtooth oscillator.

To overcome this disadvantage, in another method the frequency of the sawtooth oscillator is controlled by means of a direct control voltage which is obtained, for example, from a comparison, of the phases of the synchronizing signal and the signal provided by the sawtooth oscillator, the direct control voltage being smoothed by means of a smoothing network having a comparatively great time-constant relative to the sawtooth period, resulting in a high insensitivity to interference which is usually of short duration. However, a difficulty involved in this so-called indirect synchronization is that the control voltage source (for example the phase discriminator) may usually be loaded only slightly. In a circuit with electron tubes this difficulty may be mitigated by applying the direct control voltage to a grid of an electric tube conveying no current or only a small current. In transistorized circuits, however, the difficulty involved in this respect is considerably greater since a permanent current is required for the control of transistors.

An object of the invention is to provide a circuit for the control of the oscillation frequency of a transistorized sawtooth oscillator by means of a direct control voltage in which a very small control power only is needed. According to the invention, the direct control voltage is applied to one electrode of a diode and a sawtooth voltage produced by the sawtooth oscillator is applied to the other electrode thereof, the diode being cut-off during both the forward stroke and the return stroke of the sawtooth voltage and being conducting only during the passage from one stroke period to the other, the current flowing through the diode bringing about the passage of the oscillator from the said one period to the other.

A further advantage of the circuit according to the invention, in contrast with the majority of known circuits, is that the oscillation frequency is controlled without variation in the slope of the sawtooth provided by the oscillator. This is important especially in systems in which direct synchronization is used in addition to the indirect synchronzation. In such systems the oscillator, if it becomes desynchronized, is immediately synchronized so that the desired condition of synchronization is rapidly obtained. Subsequently, the direct voltage from the phase discriminator is readjusted until the condition is reached at which the natural frequency of the oscillator determined by the direct control voltage substantially corresponds to the frequency of synchronization. Once this condition is obtained, the direct synchronization is switched off completely or substantially and the control of the oscillator is taken over completely or substantially by the direct control voltage.

In such systems, it is important that the direct voltage control does not cause any variation in the slop of the sawtooth provided by the oscillator since otherwise the dimension of the timebase, for example, the television raster, obtained by means of the sawtooth produced varies during said readjustment of the direct control voltage. The present invention provides a simple solution to the problem above referred to.

In order that the invention may be readily carried into effect, it will now be described in detail, by way of example, with reference to the accompanying diagrammatic drawings, in which.

Figure 1:
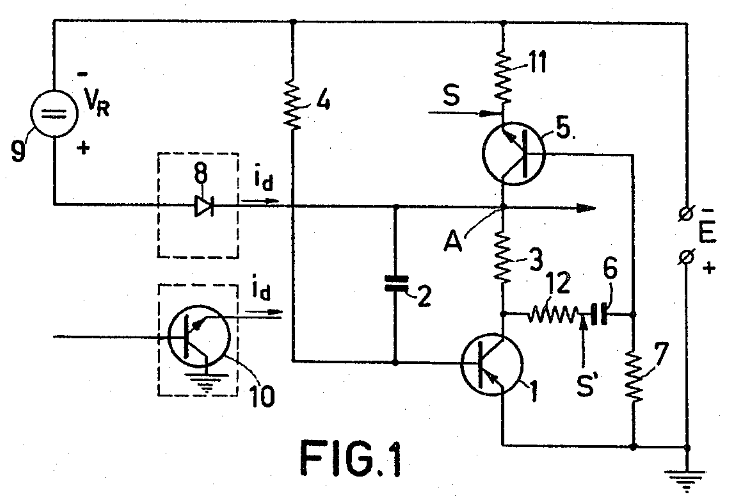
FIGURE 1 shows a first embodiment of a circuit according to the invention.

The circuit of FIGURE 1 includes a transistorized sawtooth oscillator of the Miller integrator type. This Miller integrator comprises a pnp-type integration transistor 1, an integration capacitor 2 connected, on the one hand, to the base of the integration transistor and, on the other hand, through a resistor 3 to the collector thereof, together with a resistor 4 connected between the base of the integration transistor and the negative terminal of a supply voltage source E. An npn-type transistor 5 included between the capacitor 2 and the negative terminal of the source E serves to charge the integration capacitor to approximately the battery voltage —E during the return stroke periods of the sawtooth.

Figure 2:
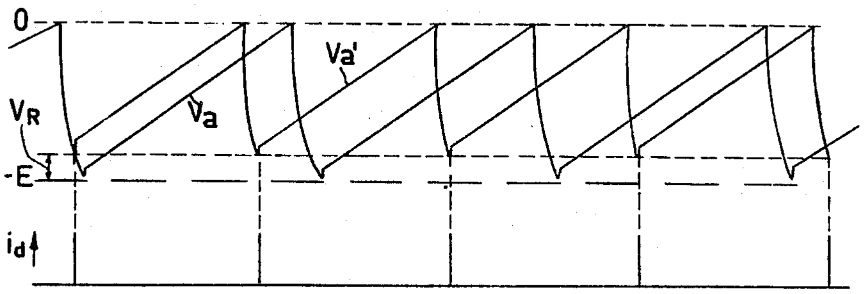
FIGURE 2 shows several voltages occurring in the circuit of FIGURE 1.

During the forward stroke, the transistor 5 is cut-off and the capacitor 2 is discharged through the emitter-collector circuit of the transistor 1 and the resistors 3 and 4. The discharge current then occurring is substantially constant so that the voltage V set up across the capacitor 2 (at point A) has a linear shape (FIGURE 2, curve $V_a$). When the integration capacitor 2 is discharged almost completely (the voltage $V_a$ is then almost equal to earth potential) the switching transistor 5 is opened. During the subsequent return stroke, the capacitor 2 is charged through the emitter-collector circuit of transistor 5 and the emitter-base circuit of transistor 1. Due to the resistance present in this charging circuit, which resistance may be increased, if desired, by providing the transistor 5 with an emitter resistor 11, the capacitor 2 is charged exponentially (curve $V_a$ of FIGURE 2). It should be noted that both transistors 1 and 5 are saturated during the return stroke.

When the process of charging the capacitor 2 is almost completed and hence the charging current flowing through the base-emitter circuit of transistor 1 has considerably decreased, the transistor commences to come out of saturation and the switching transistor 5 is cut-off. Subsequently a new forward stroke period begins in the manner as previously described.

The timely opening and cutting-off of the switching transistor 5 is effected automatically in the Miller integrator shown by means of an alternating-voltage coupling between the collector of the integration transistor and the base of the switching transistor. To this end, an RC-coupling comprising a coupling capacitor 6 and a resistor 7 is included between the said two electrodes having a time constant which is extremely longer than a sawtooth period.

To control the oscillation frequency of the above described transistor sawtooth-oscillator by means of a direct control voltage, the circuit includes a diode 8 the cathode of which is connected to the common point (A) of the integration capacitor 2 and the resistor 3. The direct control voltage $V_R$ provided by a control voltage source 9, shown symbolically, is applied to the anode of the diode 8. To clarify this, FIGURE 2 shows the voltages $V_a'$ and $V_R$ which appear at the cathode and the anode, respectively, of the diode.

At the beginning of the forward stroke, the voltage $V_a'$ at point A is positive relative to the anode voltage $V_R$ of the diode so that the diode is cut-off. The sawtooth voltage at point A becomes more and more positive as the forward stroke progresses so that the diode remains cut-off and the control voltage $V_R$ connected through this diode cannot therefore exert any influence on the shape, more particularly on the slope of the sawtooth voltage during the forward stroke. A further advantage is that, since the diode is not conducting during the forward stroke, the control-voltage source 9 is not loaded during this period.

After the forward stroke is terminated, the capacitor 2, as previously described, is charged negatively so that the voltage at point A decreases. As long as the voltage at point A is positive relative to the control voltage at the anode of the diode, the diode remains cut-off and the process of charging the integration capacitor can therefore proceed normally, and the control-voltage source 9 is not loaded during this time.

If, however, the process of charging the integration capacitor has progressed so far that the voltage at point A becomes equal to the control voltage at the anode of the diode, the diode becomes conducting. The diode current then occurring which is shown as $i_d$ in FIGURE 1, flows through the capacitor 2 and the base-emitter circuit of transistor 1 in opposite direction to the charging current of the capacitor 2, which also flows through said circuit. The diode current $i_d$ then brings the transistor 1 out of the saturated condition which it occupies during the return stroke. A voltage drop thus results at the collector of transistor 1 and also, due to the RC-coupling 6 and 7, at the base of transistor 5. The voltage drop at the base has the result that the switching transistor is cut-off and hence the voltage at its collector (point A) increases slightly (curve $V_a'$ in FIGURE 2). The diode 8 is again cut-off due to this increase in voltage which is active at its cathode.

The control voltage $V_R$ set up through the diode 8 thus causes the return stroke to be terminated before the capacitor 2 is charged completely and hence the forward stroke to begin with an integration capacitor which is not charged completely. Since the speed (the slope) at which said capacitor is discharged during the forward stroke remains unchanged it follows that, due to the control voltage applied, the period of the forward stroke has become shorter and hence the oscillation frequency of the sawtooth oscillator has increased (see in FIGURE 2 the curves $V_a$ and $V_a'$, which relate to a control voltage equal to zero and a control voltage $V_R$ respectively). The oscillation frequency increases as the control voltage applied to the anode of the diode 8 becomes more positive.

From the foregoing it also follows that the diode 8 is cut-off during both the forward stroke and the return stroke. As soon as the diode commences to conduct not only does the diode current cause the earlier passage from return stroke to forward stroke, but also this passage causes the diode to be immediately cut-off again. The period during which the diode is conducting is therefore very short relative to the total period of oscillation of the oscillator ($i_d$ curve of FIGURE 2) and the total power to be supplied by the control-voltage source 19 is therefore very low.

A further decrease in the required control power may be obtained by replacing to diode 8 by an npn-type transistor 10 having its base connected to the control-voltage source 9 and its emitter connected to point A of the sawtooth oscillator. The collector of transistor 10 may, for example, be connected to ground. The base-emitter diode of said transistor has the same function as the diode 8 and the emitter-collector current of the transistor which flows through said emitter-base diode is supplied through the capacitor 2 to the base of the integrating transistor 1. However, the current to be supplied by the control-voltage source 9 is even smaller than in the diode circuit since the circuit including the transistor 10 utilizes the current gain properties thereof.

In the circuit of FIGURE 1, resistors 11 and 12, which have comparatively low resistance compared to the remaining resistors, are included respectively in the emitter circuit of transistor 5 and in series with the capacitor 6. These resistors prevent the current pulses $i_d$ from dissipating through the transistor 5, which is in the saturated condition during the return stroke, instead of through the base-emitter circuit of transistor 1. Furthermore these resistors may serve as impedances for synchronizing pulses which may be applied, for example, to the point S or S' for the direct synchronization of the oscillator.

Figure 3:
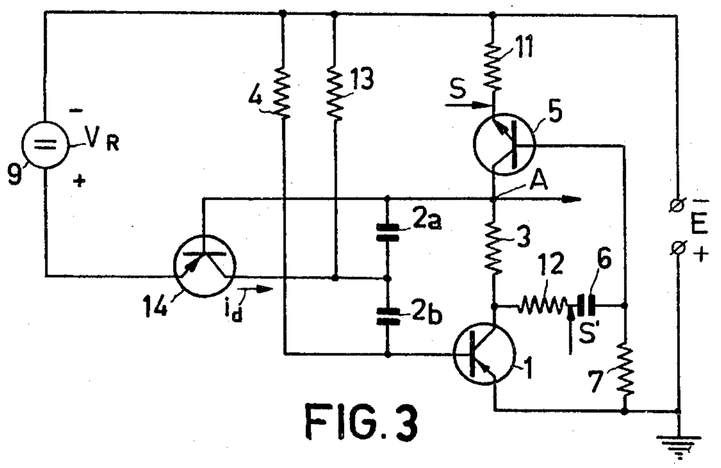
FIGURE 3 shows a second embodiment of a circuit according to the invention.

A second embodiment of a circuit according to the invention, which includes a Miller integrator similarly as the circuit of FIGURE 1, is shown in FIGURE 3. Circuit elements of this example which correspond to those of FIGURE 1 are indicated by the same reference numerals.

In the embodiment of FIGURE 3, the integrating capacitor comprises a series-combination of two capacitors *2a* and *2b* the common point of which is connected through a resistor 13 to the negative terminal of the supply-voltage source E. This step is taken if the sawtooth voltage produced is distorted by RC-coupling networks included in the further stages connected to the oscillator. By means of resistor 13 the sawtooth voltage is given a distortion which is opposite to said distortion of the further stages so that the two distortions compensate one another.

In the example of FIGURE 3, the control-voltage source 9 is connected to the emitter of a pnp-type transistor 14 and the base is connected to point A of the sawtooth oscillator. The voltage $V_a'$ and $V_R$, which thus appear at the emitter-base diode of transistor 14, are the same as those which are applied in FIGURE 1 to the diode 8 and the emitter-base diode of transistor 10 respectively (FIGURE 2). The transistor 14 is therefore cut-off during both the forward stroke and the return stroke and is conducting only during the passage from return stroke to forward stroke, the transistor current $i_d$ itself bringing about this passage. In contrast with FIGURE 1, this current is derived from the collector instead of the emitter. To this end, the collector is connected to the common point of the capacitors *2a* and *2b*. The current $i_d$ flows through the capacitor *2b* and the base-emitter circuit of transistor 1 in opposite direction to the charging current of the integrating capacitor which flows through said circuit. Similarly as described with reference to FIGURE 1, the integrating transistor 1 thus comes out of saturation and the passage from return stroke to forward stroke takes place earlier. Furthermore the transistor 14 is cut-off as soon as the forward stroke begins due to the rise in voltage occurring at point A.

It should be noted that this circuit does not utilize the current gain properties of transistor 14, since the total current $i_d$ must be supplied by the source 9. However, it has been found that, in the circuit of FIGURE 3, the passage from return stroke to forward stroke is effected even much more rapidly than in the circuit of FIGURE 1, and, as a result thereof, considerable reduction in the required control power is obtained with respect to the circuit including the diode 8. In the circuit of FIGURE 1, said passage is slightly slowed down due to the presence of parasitic inductances and the base resistor of the integrating transistor. These impedances cannot exert a slowing influence if, as shown in FIGURE 3, the current $i_d$ is derived from the collector circuit of transistor 14.

Figure 4:
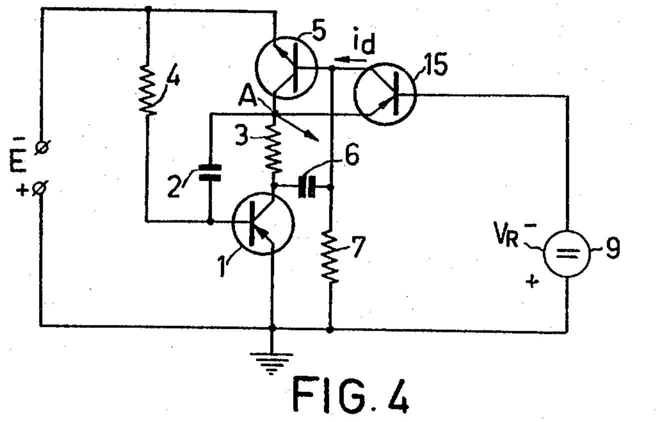
FIGURE 4 shows a third embodiment of a circuit according to the invention.
Figures 5, 6:
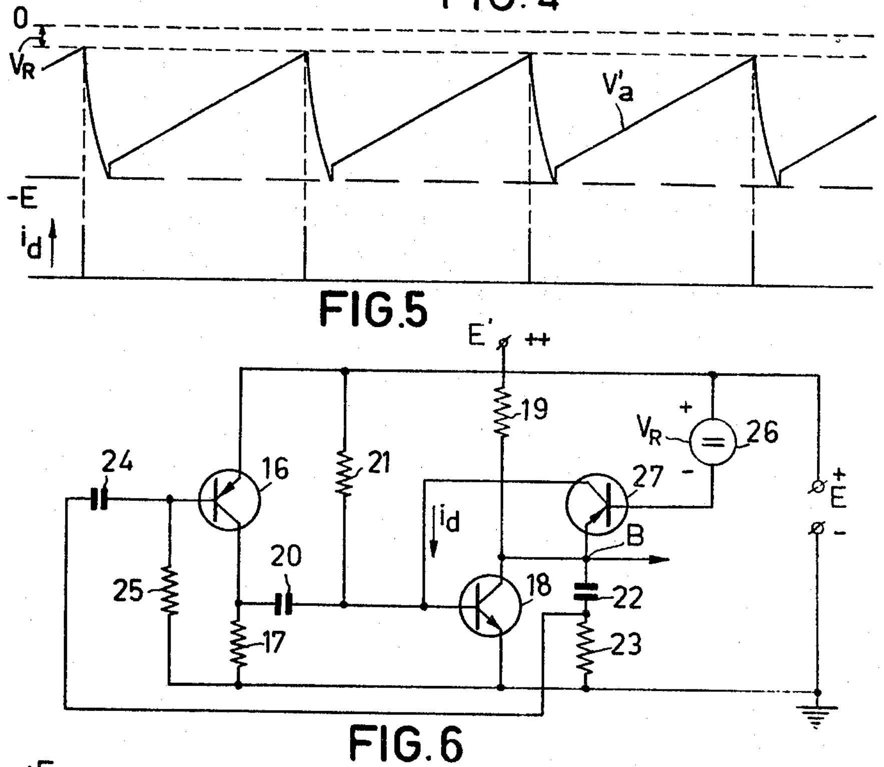
FIGURE 5 shows several voltages occurring in the circuit of FIGURE 4.
FIGURE 6 shows a fourth embodiment of a circuit according to the invention.

A third embodiment of a sawtooth oscillator including a Miller integrator is shown in FIGURE 4. In contrast with the circuits of FIGURES 1 and 3, in which the instant of passage from return stroke to forward stroke is controlled by means of the control voltage $V_R$, in the present example the instant of passage from forward stroke to return stroke is controlled. To this end, the control voltage source 9 is connected to the base of a pnp-type transistor 15 and the emitter is connected to point A of the sawtooth oscillator. The collector of transistor 15 is directly coupled to the base of the switching transistor 5. The voltages set up at the emitter and the base of transistor 15 ($V_a'$ and $V_R$ respectively) are shown in FIGURE 5. From this figure it follows that the emitter voltage of transistor 15 is negative relative to the base voltage $V_R$ during the return stroke and also during the subsequent forward stroke so that the transistor is cut-off during this period. However, the emitter voltage $V_a'$ increases during the forward stroke and as soon as this voltage has become equal to the base voltage $V_R$ the transistor 15 becomes conducting. The resulting collector current $i_d$, which is supplied to the base of the switching transistor 5, that is cut-off during the forward stroke, makes said transistor conducting, thus causing the beginning of the return stroke. The control voltage $V_R$ thus results in the return stroke being started before the integrating capacitor discharged completely. The period of the forward stroke is thus shortened and the oscillation frequency of the sawtooth oscillator increased.

It should be noted that, as soon as the current $i_d$ has caused the passage from forward stroke to return stroke, the potential at point A decreases due to the switching transistor 5 then having become conducting. This voltage drop is also active at the emitter of transistor 15 which transistor is thus rapidly cut-off. Since this circuit furthermore utilizes the current gain properties of the transistor 15, the control power required is extremely low.

Figure 7:
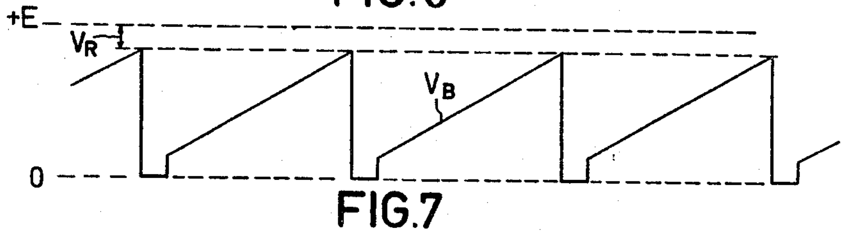
FIGURE 7 shows several voltages occurring in the circuit of FIGURE 6.

A fourth embodiment of a circuit according to the invention, which utilizes a sawtooth oscillator of the multivibrator type, is shown in FIGURE 6. FIGURE 7 shows several voltages occurring therein for the sake of clarity.

The sawtooth oscillator of FIGURE 6 includes a pnp-type transistor 16 having a collector resistor 17 and an npn-type transistor 18 which is connected through a collector resistor 19 to a preferably high supply voltage E'. The collector of transistor 16 is coupled to the base of transistor 18 through an RC-network comprising a capacitor 20 and a resistor 21. A capacitor 22, connected to the collector of transistor 18 is charged through the resistor 19 during the forward stroke, during which time the transistor 18 is cut-off, and is subsequently discharged through transistor 18 during the return stroke. Thus a sawtooth voltage (curve $V_B$ of FIGURE 7) is set up at the collector of said transistor (point B).

A comparatively low-ohmic resistor 23 is connected in series with the capacitor 22 and the voltage set up across resistor 23 is applied to the base of transistor 16 through an RC-network comprising a capacitor 24 and a resistor 25. It is thus ensured that the circuit is self-oscillating.

The two transistors 16 and 18 are in the saturated condition during the return stroke, the duration of the return stroke being determined by the time constant of the network 24, 25. The two transistors are cut-off during the forward stroke and this period is determined by the time constant of the network 17, 20, 21, which is chosen to be considerably longer than that of the network 24, 25.

To control the oscillation frequency of the sawtooth oscillator thus built up, a control voltage $V_R$ derived from a control-voltage source 26 is applied to the base of a pnp-type transistor 27. The emitter thereof is connected to the collector of transistor 18 (point B) and the collector of transistor 27 is connected to the base of transistor 18.

From the voltages $V_B$ and $V_R$ shown in FIGURE 7, which appear at the emitter and the base respectively of transistor 27, it follows that this transistor is cut-off during the return stroke as well as during the subsequent forward stroke. Only at the end of the forward stroke has the voltage at point B increased to the value of the control voltage $V_R$ so that the transistor 27 becomes conducting. The resulting collector current $i_d$ is supplied to the base of the transistor 18, which is cut-off during the forward stroke, so that this transistor is made conducting and the return stroke begins. The forward stroke is terminated earlier as the control voltage $V_R$ is more negative so that the oscillation frequency of the sawtooth oscillator increases. It should be noted that, as soon as transistor 18 commences to conduct, the voltage at is collector ($V_B$) greatly decreases so that the transistor 27 is cut-off as soon as the passage from forward stroke to return stroke has taken place. Similarly as in the circuits described with reference to FIGURES 1, 3 and 4, only very narrow current pulses $i_d$ flow in the circuit of FIGURE 6. Since, furthermore, the current pulses to be supplied by the source 26 are still amplified by the transistor 27, the control-voltage source 26 is loaded only very slightly.

What is claimed is:

1. A circuit for controlling the oscillation frequency of a transistor sawtooth oscillator by means of a direct control voltage, comprising a transistor sawtooth oscillator, a diode, a source of a direct control voltage connected to one electrode of said diode, means applying a sawtooth voltage produced by said sawtooth oscillator to the other electrode of said diode, the magnitude of said control voltage relative to said sawtooth voltage being such that said diode is cut-off during both the forward stroke and the return stroke of said sawtooth voltage and is conductive only near the end of one of said strokes, and means for applying the current flowing through said diode to said oscillator to trigger the oscillator from said one stroke to the other.

2. A circuit for producing sawtooth waveform oscillations of controllable frequency, said circuit comprising a free-running transistor oscillator connected to generate a voltage having a sawtooth shaped waveform, a source of a direct control voltage, diode means, means connecting said source between one electrode of said diode means and a point of constant potential, means connecting the other electrode of said diode means to a point on said oscillator where said sawtooth shaped waveform voltage appears, said control voltage having a magnitude and polarity relative to said sawtooth voltage to bias said diode means to its non-conductive state during the forward and return strokes of said sawtooth waveform voltage and to be conductive only at the end of one of said strokes, whereby conduction of current between said source of control voltage and said point on said oscillator through said diode means effects the transition in said oscillator to the other of said strokes.

3. A circuit for producing sawtooth waveform oscillation, of controllable frequency, said circuit comprising a free-running transistor oscillator, said oscillator having capacitor means across which a sawtooth waveform voltage is produced as a result of charging and discharging current flowing in said capacitor means, a source of a control voltage, diode means, means connecting said source between a point of constant potential and one electrode of said diode means, means connecting the other electrode of said diode means to a terminal of said capacitor at which said sawtooth waveform voltage appears, said control voltage having a magnitude and polarity relative to said sawtooth waveform voltage to bias said diode means to its non-conductive state during both the forward and return strokes of said sawtooth waveform voltage and to permit conduction of said diode means only near the end of one of said strokes, whereby current flow through said diode means near the end of said one stroke flows in said capacitor means in the opposite direction to current flowing therein during said one stroke and thereby effects a transition in said oscillator to the other of said strokes.

4. The circuit of claim 3 in which said diode means is comprised of the emitter-base diode of a transistor.

5. A sawtooth waveform oscillator having a controllable frequency, comprising a source of operating potential having first and second terminals, first and second transistors of opposite conductivity type, resistor means, means connecting the emitter-collector path of said first transistor, said resistor means, and the emitter-collector path of said second transistor serially in that order between said first and second terminals, the collectors of said first and second transistors being connected to opposite ends of said resistor means, integrating capacitor means, means connecting said integrating capacitor means between the base of said first transistor and the collector of said second transistor, whereby said integrating capacitor is discharged by way of said resistor means and the emitter-collector path of said first transistor during the forward stroke and is charged by way of the emitter-collector path of said second transistor and the emitter-base path of said first transistor during the return stroke, whereby a sawtooth waveform voltage appears at the electrode of said integrating capacitor connected to the collector of said second transistor, a source of control voltage, diode means, means connecting said source of control voltage between one of said terminals and one electrode of said diode means, and means connecting the other electrode of said diode means to said electrode of said integrating capacitor means, said control voltage having a magnitude and polarity relative to said sawtooth waveform voltage to bias said diode means to its non-conductive state during said forward and return strokes and to permit conduction thereof only near the end of one of said strokes, whereby current flow through said diode means flows in said integrating capacitor means in the opposite direction to current flow therein during said one stroke and thereby effects a transition in said oscillator to the other of said strokes.

6. The oscillator of claim 5 in which said source of control voltage is connected between said second terminal and said one electrode of said diode means, whereby said diode means conducts only near the end of said return stroke.

7. The oscillator of claim 6 in which said integrating capacitor means comprises first and second serially connected capacitors, and said diode means comprises the emitter-base path of a third transistor, comprising means connecting the collector of said third transistor to the junction of said first and second capacitors, and second resistor means connected between said junction and said second terminal, whereby said sawtooth waveform is distorted.

8. The oscillator of claim 5 comprising first resistor means connected between said second terminal and the base of said first transistor, and second resistor means connected between the base of said second transistor and said first terminal.

9. The oscillator of claim 5 in which said diode means is the base-emitter path of a third transistor, wherein said source of control voltage is connected between said first terminal and the base of said third transistor, the emitter of said third transistor is connected to said electrode of said integrating capacitor means, whereby said third transistor conducts only near the end of said forward stroke, and means connecting the collector of said third transistor to the base of said second transistor.

10. A sawtooth waveform oscillator having a controllable frequency, comprising a transistor multivibrator, said multivibrator comprising a source of operating potential, having first and second terminals, a resistor, a capacitor, means serially connecting said resistor and capacitor between said first and second terminals in that order, whereby said capacitor is charged by way of said resistor, a first transistor, means for connecting the emitter-collector path of said first transistor in parallel with said capacitor whereby said capacitor discharges through said emitter-collector path when said first transistor conducts, and a second transistor cross-coupled to said first transistor to form a free-running multivibrator, a source of control voltage, a third transistor, means connecting the base-emitter path of said third transistor and said source of control voltage between the collector of said first transistor and a point of constant potential in that order, said control voltage having such a magnitude and polarity relative to the voltage at the collector of said first transistor that said third transistor is cut-off during the charging and discharging periods of said capacitor and conducts only near the end of one of said periods, and means connecting the collector of said third transistor to the base of said first transistor.

No references cited.

ROY LAKE, *Primary Examiner.*

S. H. GRIMM, *Assistant Examiner.*